United States Patent [19]

Horino

[11] 4,234,016

[45] Nov. 18, 1980

[54] ACCUMULATOR

[75] Inventor: Kunio Horino, Yokohama, Japan

[73] Assignee: Tokico Ltd., Kanagawa, Japan

[21] Appl. No.: 87,800

[22] Filed: Oct. 24, 1979

Related U.S. Application Data

[63] Continuation-in-part of Ser. No. 926,388, Jul. 20, 1978, abandoned.

[30] Foreign Application Priority Data

Jul. 20, 1977 [JP] Japan ................................ 52-87142
Oct. 20, 1977 [JP] Japan ................................ 52-140864

[51] Int. Cl.3 ................................ F16L 55/04
[52] U.S. Cl. ................................ 138/30; 220/85 B
[58] Field of Search .................. 138/26, 30; 220/85 B

[56] References Cited

U.S. PATENT DOCUMENTS

| | | | |
|---|---|---|---|
| 3,220,594 | 11/1965 | Ortheil et al. | 138/30 X |
| 3,540,482 | 11/1970 | Fulmer | 138/30 |
| 3,960,178 | 6/1976 | Merciek | 138/30 |

FOREIGN PATENT DOCUMENTS

| | | | |
|---|---|---|---|
| 2019326 | 11/1971 | Fed. Rep. of Germany | 138/30 |
| 2242942 | 3/1974 | Fed. Rep. of Germany | 138/30 |
| 1513798 | 2/1968 | France | 138/30 |

*Primary Examiner*—James E. Bryant, III
*Attorney, Agent, or Firm*—Stevens, Davis, Miller & Mosher

[57] ABSTRACT

An accumulator comprises a first container having cylindrical body with a liquid inlet at its bottom portion, a second container fixed to the open end of the first container so as to form a hollow portion with the first container, and a flexible member disposed in the hollow portion so as to partition the hollow portion into two compartments.

4 Claims, 2 Drawing Figures

ACCUMULATOR

Figure 1:
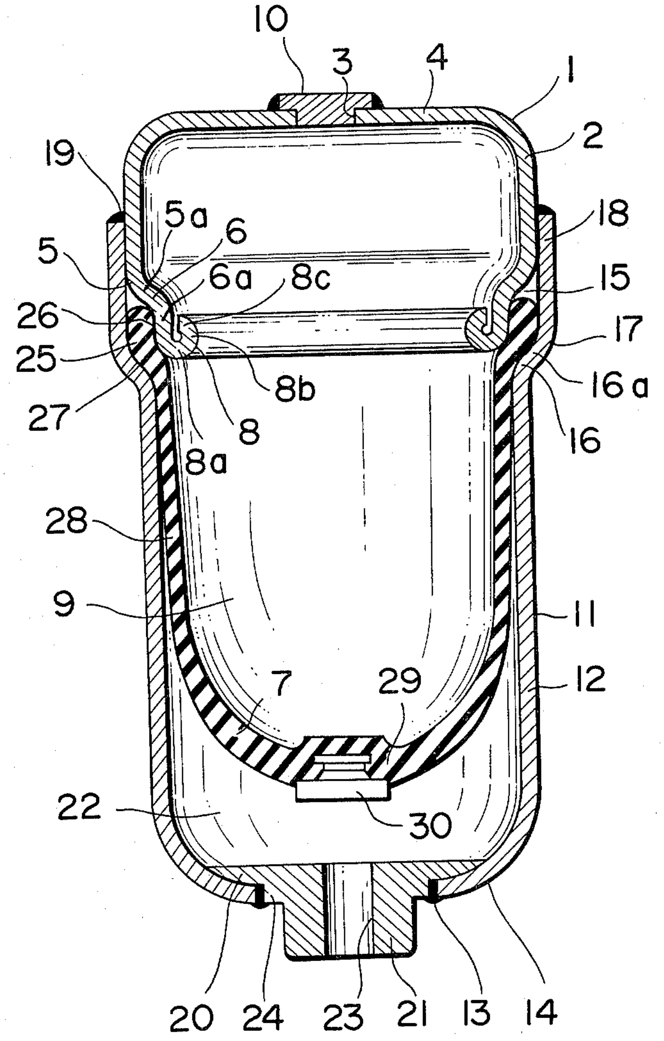

This application is a continuation-in-part application of the pending prior application Ser. No. 926,388 filed July 20, 1978 now abandoned.

This invention relates to the improvement in an accumulator.

In the general construction of an accumulator, the outer body or shell of an accumulator is formed with a single hollow member, and the gas-liquid separating members such as rubber bladder, piston, etc., are disposed in the shell.

For the so-called bladder-type accumulator which employs a bladder of rubber and like materials, it is normally required to insert such rubber bladder from a relatively small opening located at the lower part of the shell into its work position therewithin in an installation step, and this is usually quite a troublesome work. Furthermore, as the rubber bladder is originally of an oval form in its longitudinal sectional shape, it is very possible that it can hardly be restored to its original shape when it was once caused to be shrunk or deformed with an inflow of a working liquid into the inside of the shell, so that the bladder itself might thus become a source of trouble such as a lost function of the accumulator. Although there has been proposed a rubber bladder having a guide core or bar extending therealong in an attempt to prevent such a trouble, such arrangement would naturally add complicatedness in manufacture and increase a production cost. There has also been proposed an accumulator provided with a bell-shaped rubber bladder, such as disclosed in the U.S. Pat. No. 3,540,482. In this type of accumulator, the outer shell comprises two separate members and the rubber bladder has circumferential edge held in position between the jointed ends of the two outer shell members. According to such construction of the accumulator, however, it would generally become more complicated in construction, and thus bringing an increased difficulty in installation work.

In addition, when assembling such outer shell comprising these two separate members, it is necessary to have them jointed rigidly by way of such as welding means so that they would never come off from each other, but if they are subjected to heat from welding, there is a fear that the rubber bladder nested closely in the jointed portion of the separate two members to be connected would be damaged very possibly.

Moreover, since the outer shall member of an accumulator of the conventional construction is normally made of steel for forgings, the step of grinding is essentially required for the internal surface of the shell for the prevention of a possible damage of the rubber bladder, which might occur when the bladder comes repeatedly in contact with the internal unfinished surface of the shell member, and which grinding step would naturally take substantially labor and time, thus resulting in a substantially poor working property.

It is therefore a primary object of the present invention to provide an improved accumulator which is free from such drawbacks of the conventional arrangement as stated hereinbefore.

It is another object of this invention to provide an improved accumulator which is simple in construction and can be made relatively small in size.

It is a further object of this invention to provide an improved accumulator which has almost no possibility of bringing damage of the bladder incorporated therein either in an assembly work or in use.

According to the present invention, there is provided an accumulator in which a first container has a cylindrical body extending generally straightly and upwardly from its bent portion to its open end to such an extent that the open end may be parted at a substantial distance from an annular space where an open end of a flexible member is held in position, and there is provided a weld at the open end of the first container so as to attain due connection of the first container to a second container, and the open end of the second container is curved or curled continuously in an arcuate shape in profile so as to attain an effect of yieldable deformation of the flexible member around the smooth outer circumferential surface of the second container.

In other words, for this type of accumulator, it would be an essential requirement to provide the one which can be manufactured with simplicity and ease. According to this invention, in order for satisfying this essential requirement, a joint or connection of the first container to the second container is conducted by way of welding. More particularly, by way of a further preferable embodiment of this invention, the first and second containers are respectively formed from a metal plate by press work for the purpose of having a working property improved substantially. Moreover, according to this invention, particularly for the purpose of preventing a possible damage of the flexible member by heat to be generated in welding, the first and second containers are formed with such special profiles that the open end of the first container is placed at a substantial distance from the annular space where the thickened portion of the flexible member is nested in position so that welding heat may well be dissipated till it propagates to the annular space defined between the first and second containers. In addition, in order to further the advantageous effect of protection of the flexible member from being damaged during the procedures of manufacture as stated hereinabove, there is presented a further advantageous feature of this invention, i.e., the open end of the second container having the continuously curved or curled arcuate shape in profile which is specifically designed for allowing the flexible member to be deformed smoothly with a least possibility of damage in use, or otherwise the flexible member would get worn substantially earlier. By way of this further preferable embodiment of this invention, the second container is shaped in its open end profile in such a manner that it is firstly turned radially inwardly, then turned upwardly and finally turned radially outwardly, thus forming the open end of a generally continuously curved or curled arcuate shape in profile.

The present invention will now be described by way of preferred embodiments in conjunction with the accompanying drawings.

Figure 2:
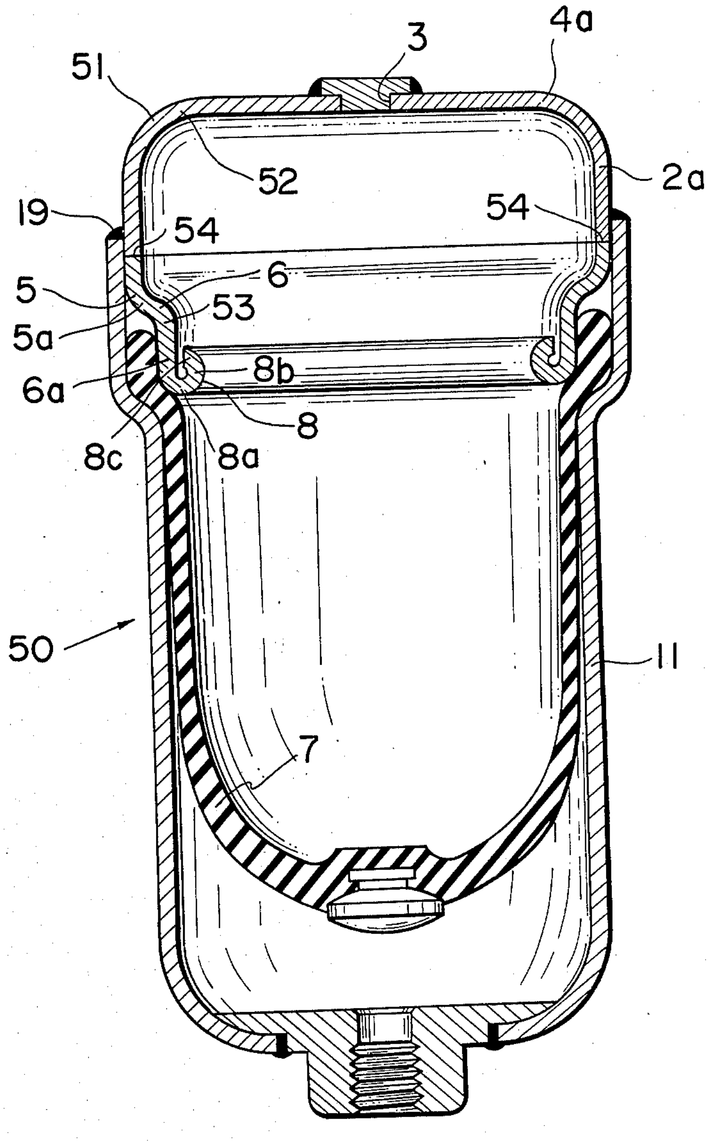

FIG. 1 is a longitudinal cross-sectional view showing a preferred embodiment of an accumulator according to this invention; and FIG. 2 is a similar longitudinal cross-sectional view showing another embodiment of this invention.

Now, referring to FIG. 1, a hollow container 1 comprises a cylindrical body portion 2 and a top portion 4 formed integrally with and extending as a top cover from the cylindrical body portion 2 and having a through opening 3 generally in the center thereof. This container 1 is substantially uniform in thickness and is formed integrally by way of press work from, for example, a metal plate. The cylindrical body 2 has a portion 5 bent radially inwardly and a portion 6 bent downwardly extending from the portion 5 through a slant or inclined portion 5*a* therebetween, and then extending further downwardly from the portion 6. The inclined portion 5*a* is not necessarily essential in construction. The leading end 8 of a portion 6*a* extending continuously downwardly from the bent portion 6 has a portion 8*a* firstly turned radially inwardly, a portion 8*b* adjacent the portion 8*a* and turned upwardly, and a further portion 8*c* adjacent the portion 8*b* and turned further radially outwardly, thereby to form an open end of the cylindrical body of a continuously curved or curled substantially arcuate shape in profile, in order to prevent a possible damage of a flexible member 7 made of rubber and the like while in use. The gas opening or inlet 3 is closed with a plug 10 for keeping the chamber 9 airtight from the outside after a gas is charged therein.

A hollow container 11 has a cylindrical body 12 and a bottom portion 14 formed integrally with and extending radially inwardly from cylindrical body 12 and having an opening 13 in the center thereof. This container 11 has a substantially uniform thickness as in the container 1 mentioned above, and is formed integrally by way of press work from a steel plate, for example. The upper part 18 of the cylindrical body 12 is enlarged in its diameter in such a manner that the upper part of the cylindrical body 12 comprises a portion 16 bent radially outwardly and a portion 17 extending from the portion 16 through an inclined portion 16*a* and bent upwardly so as to form an annular space 15 in the corresponding bent portions of the cylindrical body 2. The cylindrical portion higher than the portion 17 extends straightly with a substantial extension in such a manner that it may come to be generally in parallel with the lower part of the cylindrical body 12. The cylindrical protion 18 lying above from the portion 17 has an inner diameter defined in correspondence with the outer diameter of the cylindrical body 2 of the container 1 so that the inner surface of the upper portion 18 of the cylindrical body 12 may fit closely with the corresponding outer surface of the cylindrical body 2 of the container 1. Incidentally, the inclined portion 16*a* is not necessarily essential in construction.

The container 11 is fixed rigidly, as by way of welding, to the cylindrical body 2 of the container fitted in the inner circumference of the cylinder 11, at the opening end 19 of the cylindrical body 12. As a consequence, by virtue of such arrangement that the opening end 19 of the cylindrical body 12 is located at a substantial distance from the annular space 15, it is assured that heat to be generated during welding and propagating through the containers 1 and 11 may be dissipated efficiently and positively at the area around the upper part 18 of the cylindrical body 12 before it reaches the annular space 15. Inserted into the opening 13 of the cylindrical body 12 is a connecting member 21 having an integral circular flange 20, the connecting member 21 having a liquid inlet 23 opened at its one end to the outside and at the other end into the chamber 22. This connecting member 21 is further connected to a pipe (not shown) through which the working liquid is introduced into the chamber 22. The annular shoulder portion 24 of the connecting member 21 has a substantially same diameter as that of the opening 13, and the connecting member 21 is welded to the container 11 at the shoulder portion 24 thereof. The flexible member 7 made of rubber is of a hollow or inverted bell shape, and has an annular open end 25 of an increased thickness, and this thickened end portion 25 is tightly fitted into the annular space 15. The inner peripheral surface 26 of the thickened end portion 25 is tightly urged against the outer peripheral surface of the arcuately curled end 8 and the portion 6*a* of the cylindrical body 2 of the container 1, and the outer peripheral surface 27 of the end portion 25 is also urged positively against the corresponding inner circumferential surface of the container 11. At the same time, this thickened end portion 25 is resiliently sandwiched between the containers 1 and 11. Such arrangement ensures an air-tightness of the chamber 9 and a liquid-tightness of the chamber 22. The middle portion 28 of the flexible member 7 extending downwardly from the annular end portion 25 is formed in such a manner that its wall thickness becomes gradually thinner than the thickness of the end portion 25. This thin-walled middle portion 28 extends along the inner circumferential surface of the container 11, while it gradually increases in thickness toward downwradly and terminating at a top portion 29. Nearly at the center of the top portion 29 there is embedded a disc-shaped protection metal member 30 adapted to prevent damage of the member 7 from possible repeated contact thereof with the connecting member 21 during the use. With such arrangement, the interior space defined by the containers 1 and 11 is partitioned by the member 7 into the chambers 9 and 22, and then a gas is charged at a high pressure into chamber 9, while a working fluid is allowed to flow into or out of the chamber 22 through the inlet or port 23.

In the accumulator with such arrangement, when a working liquid is admitted into the chamber 22 through the inlet or port 23 provided in the connecting member 21, the flexible member 7 is caused to displace upwardly to compress the gas within the chamber 9. As the open end portion 25 of the member 7 is positively held by the containers 1 and 11 within the annular space 15, the portion 25 of the member 7 is not detached from the space 15. Also, in the state of displacement mentioned above, the part near the open end 25 of the member 7 is caused to be deformed smoothly along the smooth outer peripheral surface of the leading end 8 of the container 1 so that there is substantially no possibility of damage of the member 7 to be caused from the frictional movement therewith. When the liquid pressure within the chamber 22 comes lower, the member 7 is now allowed to depend downwardly by aid of the gas pressure charged within the chamber 9 so as to restore the original shape as shown in FIG. 1, and then the liquid remained in the chamber 22 is forced to be discharged into the discharging pipe through the port 23.

Description will now be given on another embodiment of this invention with reference to FIG. 2. In this embodiment, same parts or members are designated with same reference numerals as in the preceding embodiment shown in FIG. 1, and redundancy in description shall be avoided, accordingly. In an accumulator 50 according to this alternative embodiment, a container 51 which corresponds to the container 1 as in the foregoing embodiment described herein comprises two essential members, i.e., a cap-like member 52 and an annular member 53. This arrangement is to provide a solution to such difficulties that may be encountered in press work or deep drawing work for the formation of the hollow container, thus providing an equivalent to the hollow container construction comprising two members as exemplified by way of the first-mentioned embodiment herein. The cap-like member 52 in turn has a top portion 4*a* and a cylindrical body 2*a* formed integrally with and extending from the top portion 4*a*, the top portion 4*a* having an opening 3 in the center thereof. The annular member 53 for retaining the flexible member 7 in position has a portion 5 bent radially inwardly and a portion 6 bent depending downwardly through a portion 5*a* therebetween, and also a leading end 8 extending from the bent portion 6 and curved or curled as comprising a radially inwardly turned portion 8*a*, a subsequently upwardly turned portion 8*b* and a radially outwardly turned portion 8*c*. By virtue such arrangement that the annular member 53 having the continuously curled end 8 is made separately from the cap-like member 52, it is obvious that the formation of the curled end 8 can now be made substantially easier than in the case of integral construction. The cap-like member 52 may also be formed by way of press work from a metal plate.

In assembly, the annular member 53 is firstly placed into the inside of the container 11 having the flexible member 7 therewithin so that the open end of the member 7 may be held in a sandwiched manner between the member 53 and the container 11. Thereafter, the member 52 is inserted into the container 11 with its lower end face abutting against the upper end face of the member 53, then forcing the member 52 through the member 53 to be urged against the open end of the member 7, thus causing the open end of the member 7 to be compressed downwardly against the inner surface of the container 11. With the flexible member 7 being held urgedly under the member 52, welding is conducted at the open end 19 of the container 11 so that the container 11 and the member 52 may be jointed to be integral. In this manner, by virtue of such construction that the container 51 comprises two members as stated above, it is advantageous that when the open end 19 of the container 11 is welded in position, welding heat is substantially prevented from propagating and reaching the member 53 at the abutting surfaces 54 of the member 52 and 53, and consequently an adverse effect of welding heat upon the flexible member 7 may effectively be reduced. Furthermore, as the member 53 is abutting at its upper end face upon the lower end face of the member 52, while closely in contact around the inner surface of the container 11, it is assured that the flexible member 7 may positively be held in position from displacement at the open end thereof.

What is claimed is:

1. In an accumulator which comprises a first hollow container having an opening at one end and an inlet for a working fluid at the other end, a second hollow container being jointed by welding at the opening with said first container so as to form a hollow space therewithin, and a flexible member disposed in said hollow space and partitioning said hollow space into two compartments;

the improvement wherein said first container comprises a cylindrical body having said opening at one end thereof, and a bottom portion formed integrally with and extending from the opposite end of said cylindrical body and having said fluid inlet, said cylindrical body and said bottom portion being substantially uniform and identical in thickness, the upper portion of said cylindrical body being formed with a portion bent outwardly and a portion bent and further extending upwardly from said outwardly bent portion, said upwardly extending portion extending generally straightly to said opening;

said second container comprises a cylindrical body having one open end to be snugly inserted upon the inner surface of said first container and a top portion formed integrally with the opposite end of said cylindrical body, said cylindrical body and said top portion being substantially uniform and identical in thickness, said cylindrical body having a portion bent inwardly, a portion adjacent said inwardly bent portion and bent downwardly, and a curled open end adjacent said downwardly bent portion, said bent portions and curled end of said cylindrical body of said second container being complementary in profile with said outwardly bent portion and said upwardly extending portion of said cylindrical body of said first container respectively so that there is defined an annular space between said first and second containers;

said flexible member having an annular shaped and thickened open end adapted to be held snugly in said annular space defined between said first and second containers;

said one open end of said first container being disposed at a substantial distance in the longitudinal direction toward said top end of said second container away from said annular space, whereby welding heat may be effectively dissipated until it reaches said annular shaped end of said flexible member, and the area near said annular shaped end of said flexible member may be permitted to be deformed smoothly along the smooth surface of said continuously curled end of said second container at the time of inflow of said working fluid through said inlet into said compartment.

2. The improvement as claimed in claim 1 wherein said curled end of said cylindrical body of said second container is formed in such a manner that it is firstly turned inwardly, then turned upwardly and finally turned outwardly.

3. The improvement as claimed in claim 1 wherein said first and second containers are formed by way of press work from a metal plate, respectively.

4. The improvement as claimed in any one of preceding claims 1 to 3 wherein said second container comprises two members of a cap-like member having said top portion and an annular member having said inwardly bent portion and said downwardly portion, and said cap-like member and said annular member abutting with each other.

* * * * *